UNITED STATES PATENT OFFICE.

GEORGE A. STEVENOT, OF NEW YORK, N. Y.

STAIN-REMOVING COMPOSITION.

1,151,416.     Specification of Letters Patent.     Patented Aug. 24, 1915.

No Drawing.     Application filed April 17, 1915. Serial No. 22,088.

*To all whom it may concern:*

Be it known that I, GEORGE A. STEVENOT, a citizen of the United States, and a resident of the city of New York, borough of Brooklyn, in the county of Kings and State of New York, have invented a new and Improved Stain-Removing Composition, of which the following is a full, clear, and exact description.

This invention relates to a composition of matter for removing stains and has for an object to provide a new composition which may be readily put up in such form as to be especially adapted for household use.

Another object of the invention is to provide a composition of matter which will quickly and thoroughly remove stains of various kinds, iron rust and the like, without injuring textile fabrics and other material.

In carrying out the objects of the invention and producing a supply of the composition, various equivalents and substances may be used without departing from the spirit of the invention, provided the mixtures are such as to produce a resulting effect similar to the principal ingredients recited hereinafter.

In preparing a certain amount of the composition it has been found that a desirable proportion is to mix thirty parts of sodium hydrosulfite powder with ten parts of tartaric acid powder and sixty parts of sodium hydrogen sulfite powder. These proportions may be changed within wide limits according to various requirements. The use of the sodium hydrosulfite and the tartaric acid is to produce hydrosulfurous acid in the presence of water, which acid acts upon the iron rust, iodin or other stains and dissolves or destroys the same. The use of sodium hydrogen sulfite powder is for the purpose of diluting the sodium hydrosulfite and the tartaric acid and especially reduce their power without, however, materially changing their uses and properties. It will thus be seen that the nature of the invention consists in mixing a dry salt or compound of hydrosulfurous acid, or what may be termed equivalents, that is, other chemicals which will have the same characteristics when mixed, and a dilutent.

Instead of using the active agents above set forth other chemicals could be used, such as sodium hydrogen sulfite and zinc or other suitable metal in powder form, with a dry acid such as powdered tartaric acid or citric acid, to liberate, when brought in contact with water, hydrosulfurous acid. This last acid, namely hydrosulfurous acid, is utilized to reduce, destroy or dissolve the injurious matter in a stain caused by iron rust, iodin or other materials. The mixture of sodium hydrosulfite and tartaric acid, or what may be termed equivalents thereof, may be further mixed with salts in addition to sodium hydrosulfite, said additional salts being such as potassium hydrogen tartrate, anhydrous sodium sulfate or other inert substances for the purpose of reducing the power of the hydrosulfurous acid without materially changing its action in dissolving or removing stains of iodin, iron rust or the like.

What I claim is:—

1. A composition of matter for removing stains of various kinds, comprising sodium hydrosulfite, tartaric acid and sodium hydrogen sulfite, all of said substances being in a dry state.

2. A composition of matter for removing stains, consisting of active agents and a dilutent in substantially the proportions of thirty parts of sodium hydrosulfite in a dry state, ten parts tartaric acid in a dry state and sixty parts sodium hydrogen sulfite in a dry state.

3. A composition of matter for removing stains, consisting of sodium hydrosulfite powder, tartaric acid powder and a dilutent in powdered form.

In testimony whereof I have signed my name to this specification in the presence of two subscribing witnesses.

GEORGE A. STEVENOT.

Witnesses:
    A. L. KITCHIN,
    PHILIP D. ROLLHAUS.